United States Patent
Blake et al.

(10) Patent No.: US 7,035,431 B2
(45) Date of Patent: Apr. 25, 2006

(54) SYSTEM AND METHOD FOR PROBABILISTIC EXEMPLAR-BASED PATTERN TRACKING

(75) Inventors: Andrew Blake, Stapleford (GB); Kentaro Toyama, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 748 days.

(21) Appl. No.: 10/080,449

(22) Filed: Feb. 22, 2002

(65) Prior Publication Data
US 2003/0161500 A1     Aug. 28, 2003

(51) Int. Cl.
*G06K 9/00*     (2006.01)
*G06K 9/62*     (2006.01)

(52) U.S. Cl. .................. 382/103; 382/225; 382/228
(58) Field of Classification Search ............... 382/103, 382/224, 225, 228
See application file for complete search history.

(56) References Cited

U.S. PATENT DOCUMENTS

| | | | | |
|---|---|---|---|---|
| 5,389,790 A | * | 2/1995 | Honey et al. ............... | 250/342 |
| 5,519,789 A | * | 5/1996 | Etoh ........................... | 382/225 |
| 5,703,960 A | * | 12/1997 | Soest .......................... | 382/141 |
| 5,703,964 A | * | 12/1997 | Menon et al. .............. | 382/228 |
| 5,710,833 A | * | 1/1998 | Moghaddam et al. ....... | 382/228 |
| 5,867,584 A | * | 2/1999 | Hu et al. .................... | 382/103 |
| 5,983,224 A | * | 11/1999 | Singh et al. .................... | 707/6 |
| 6,307,965 B1 | * | 10/2001 | Aggarwal et al. .......... | 382/225 |
| 6,314,204 B1 | * | 11/2001 | Cham et al. ................ | 382/228 |
| 2003/0026483 A1 | * | 2/2003 | Perona et al. ............... | 382/203 |
| 2003/0099401 A1 | * | 5/2003 | Driggs et al. ............... | 382/228 |
| 2003/0123737 A1 | * | 7/2003 | Mojsilovic et al. ......... | 382/224 |

OTHER PUBLICATIONS

Walpole, Ronald E. and Myers, Raymond H., "Probability and Statistics for Engineers and Scientists", 1978, Macmillan Publishing Co., Inc., 2nd Ed., pp. 128-131.*
Brand, M., "Shadow Puppetry", Sep. 20-27, 1999, The Proceedings of the Seventh IEEE International Conference on Computer Vision, vol. 2, pp. 1237-1244.*
Efros, A.A.; Leung, T.K., "Texture synthesis by non-parametirc sampling", Sep. 20-27, 1999, The Proceedings of the Seventh IEEE International Conference on Computer Vision, vol. 2, pp. 1033-1038.*

(Continued)

*Primary Examiner*—Jingge Wu
*Assistant Examiner*—Anthony Mackowey
(74) *Attorney, Agent, or Firm*—Lyon & Harr, LLP; Mark A. Watson

(57) ABSTRACT

The present invention involves a new system and method for probabilistic exemplar-based tracking of patterns or objects. Tracking is accomplished by first extracting a set of exemplars from training data. The exemplars are then clustered using conventional statistical techniques. Such clustering techniques include k-medoids clustering which is based on a distance function for determining the distance or similarity between the exemplars. A dimensionality for each exemplar cluster is then estimated and used for generating a probabilistic likelihood function for each exemplar cluster. Any of a number of conventional tracking algorithms is then used in combination with the exemplars and the probabilistic likelihood functions for tracking patterns or objects in a sequence of images, or in a space, or frequency domain.

38 Claims, 9 Drawing Sheets

OTHER PUBLICATIONS

Freeman, W.; Pasztor, E., "Learining to estimate scenes from images", 1999, MIT Press, Advances in Neural Information Processing Systems 11.*

Jojic, N.; Petrovic, N.; Frey, B.; Huang, T., "Transformed Hidden Markov Models: Estimating Mixture Models of Images and Inferring Spatial Transformations in Video Sequences", Jun. 2000, Proc. on Computer Vision and Pattern Recognition, vol. 2, pp 26-33.*

Blake, A.; Sullivan, J.; Isard, M.; MacCormick, J., "A Bayesian theory of multi-scale cross-correlation in images", May 10, 1999, IEE Colloquium on Motion Analysis and Tracking, pp. 1/1-1/4.*

Breuel, T.M., "Classification by probabilisitic clustering", May 7-11, 2001, Proceedings. IEEE International Conference on Acoustics, Speech and Signal Processing, vol. 2, pp. 1333-1336.*

Toyama, K.; Blake, A., "Probabilistic tracking in a metric space", Jul. 7-14, 2001, Proceedings. Eight IEEE Conference on Computer Vision, vol. 2, pp. 50-57.*

Isard, M. and A. Blake, "Contour Tracking by Stochastic Propagation of Conditional Density," *Proc. Fourth European Conf. Computer Vision*, pp. 343-356, Cambridge, England, 1996.

Frey, B. and N. Jojic, "Learning graphical models of images, videos and their spatial transformations," *Proceedings of the Sixteenth Conference on Uncertainty in Artificial Intelligence*, Morgan Kaufmann, San Francisco, CA, 2000.

Gavrila, D. M. and V. Philomin, "Real-time Object Detection for Smart Vehicles," *Proc. of IEEE International Conference on Computer Vision*, pp. 87-93, Kerkyra, Greece, 1999.

* cited by examiner

| Object | Avg. Cluster Size | Actual DOF of Curve | $d$ | $\sigma$ |
|---|---|---|---|---|
| Synthesized ellipse | 100 | 1 | 0.8 | 89.1 |
| | 100 | 2 | 1.2 | 93.3 |
| | 100 | 3 | 1.5 | 86.4 |
| | 100 | 4 | 3.6 | 71.9 |
| Person contour | 5 | ? | 2.8 | 21.6 |
| | 10 | ? | 4.1 | 14.4 |
| | 20 | ? | 5.1 | 18.3 |
| | 40 | ? | 5.0 | 17.9 |

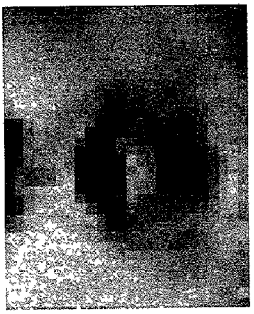
FIG. 11D
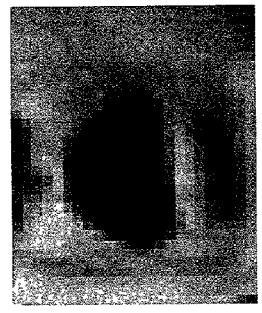
FIG. 11C
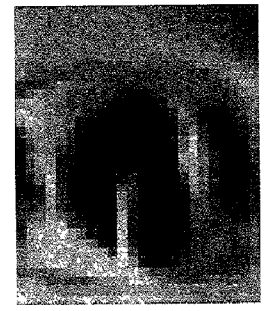
FIG. 11B
FIG. 11A
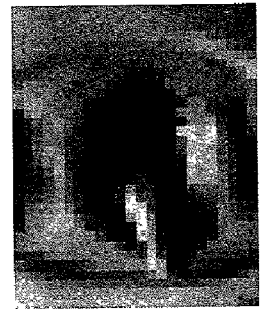
FIG. 11H
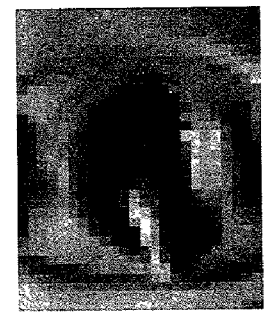
FIG. 11G
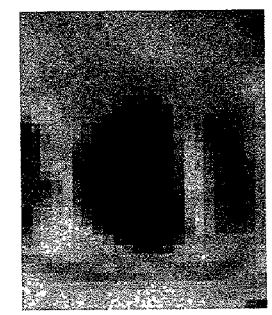
FIG. 11F
FIG. 11E

SYSTEM AND METHOD FOR PROBABILISTIC EXEMPLAR-BASED PATTERN TRACKING

BACKGROUND

1. Technical Field

The invention is related to a system for tracking patterns, and in particular, to a system and method for using probabilistic techniques to track patterns with exemplars generated from training data.

2. Related Art

There are many existing schemes for tracking objects. One class of object tracking schemes uses systems that are driven either by image features or by raw image intensity, or some combination thereof. Either way, the tracking problem can be formulated in a probabilistic framework in either or both feature-driven or intensity-driven tracking schemes. One clear advantage to using a probabilistic framework for tracking is that tracking uncertainty is handled in a systematic fashion, using both sensor fusion and temporal fusion. Such schemes are often quite successful in tracking objects. However, many such tracking schemes require the use of complex models having parameters that roughly represent an object that is being tracked in combination with one or more tracking functions. As a result, such schemes suffer from a common problem, namely, the expense, time, and difficulty in defining and training the models for each object class that is to be tracked.

Consequently, to address the problem of complicated and costly object models, another class of tracking schemes has been developed. This new class of tracking schemes provides an alternative to the use of object models and tracking functions by making use of "exemplars" for tracking objects. Exemplar-based models are typically constructed directly from training sets using conventional techniques, without the need to set up complex intermediate representations such as parameterized contour models or 3-D articulated models.

Unfortunately, existing tracking schemes that use exemplar-based models have certain limitations. For example, one fairly effective exemplar-based tracking scheme, referred to as "single-frame exemplar-based tracking," is limited by its inability to incorporate temporal constraints. Consequently, this scheme tends to produce jerky recovered motion. Further, the inability to incorporate temporal constraints also serves to reduce the ability to recover from occlusion or partial masking of the object being tracked.

Other conventional exemplar-based tracking schemes make use of a probabilistic frame-work to achieve full temporal tracking via Kalman filtering or particle filtering. One such scheme embeds exemplars in learned probabilistic models by treating them as centers in probabilistic mixtures. This scheme uses fully automated motion-sequence analysis, requiring only the structural form of a generative image-sequence model to be specified in advance. However, this approach also has several limitations.

In particular, the aforementioned scheme uses online expectation-maximization (EM) for probabilistic inference. Unfortunately, EM is both computationally intensive and limited, for practical purposes, to low resolution images. Another drawback to this approach is that images representing objects to be tracked must be represented as simple arrays of pixels. As a result, this scheme can not make use of nonlinear transformations that could help with invariance to scene conditions, such as, for example, conversion of images to edge maps. Still another drawback of this scheme is that image noise is treated as white noise, even where there are known, strong statistical correlations between image pixels. Consequently, otherwise valuable information is simply ignored, this reducing the tracking effectiveness of this scheme. Finally, because the exemplars in this scheme lack a vector-space structure, conventional probabilistic treatments, such as is useful for tracking schemes using object models as described above, are not used with this scheme.

Therefore, what is needed is a system and method for reliably tracking target objects or patterns without the need to use complex representations or explicit models of the objects or patterns being tracked. Thus, such a system and method should make use of exemplars rather than models. Further, such a system and method should make use a probabilistic treatment of the exemplars in order to better deal with uncertainty in tracking the objects or patterns.

SUMMARY

The present invention involves a new system and method which solves the aforementioned problems, as well as other problems that will become apparent from an understanding of the following description by providing a novel probabilistic exemplar-based tracking approach for tracking patterns or objects. The present invention makes use of exemplars derived from training data rather than explicit models for tracking patterns or objects. Further, an assumption is made that the derived exemplars do not necessarily have a known representation in a vector space. Consequently, it is assumed that any relationship between exemplars is unknown at the time the exemplars are derived from the training data. However, even though it is assumed that the exemplars do not exist in a vector space, a novel probabilistic treatment is applied to the exemplars in order to use the exemplars for probabilistic tracking of patterns or objects.

In general, a system and method according to the present invention uses a probabilistic exemplar-based tracking system and method to track patterns or objects. This is accomplished by first learning the exemplars from training data and then generating a probabilistic likelihood function for each exemplar based on a distance function for determining the distance or similarity between the exemplars. Any of a number of conventional tracking algorithms is then used in combination with the exemplars and the probabilistic likelihood function for tracking patterns or objects.

Exemplars are single instances of training data, which are preprocessed in alternate embodiments to emphasize invariants to irrelevant features. Generally speaking, an exemplar is basically a standard template or prototype for a particular class of patterns, which in the case of this invention, is derived or extracted from training data or input. For example, exemplars useful for tracking a walking person may be contours of a person in different walking positions. Conventional background subtraction and edge detection techniques used to process a series of training images will produce a set of exemplars that are contours of a walking person. However, it should be noted that this invention is not limited to visual tracking of objects in images. In fact, as noted above, the present invention is capable of tracking both patterns and objects. Further, such tracking also includes tracking or identification of any continuous pattern that is a function of space, or frequency.

For example, with respect to general probabilistic tracking, objects, such as people or any other object or pattern, are tracked through a sequence of image files in accordance with the present invention. The aforementioned tracking of a person using contour exemplars is but one of many types of patterns or objects that can be tracked using the present invention. In accordance with the system and method of the present invention, all that is required for tracking such objects in a video file or a sequence of image files is a training set from which conventional visual exemplar patterns can be extracted along with a distance function for determining a distance between the extracted exemplars. Such conventional visual exemplars include the aforementioned contours derived through edge detection. Distance functions for determining a distance between unparameterized curves such as the aforementioned contours include a conventional "chamfer distance." Distance functions for determining a distance between image patches include a conventional "shuffle distance." These concepts are described in further detail below.

With respect to tracking patterns as a function of space, the present invention can track or identify particular patterns in space using any of a number of techniques. Such patterns can be tracked or identified in static images, rather than in a sequence of images, as described above. For example, in tracking or identifying patterns in space, a contour in a static image can be tracked or tracked or traced using, exemplars composed of intensity profiles of a segment of pixels perpendicular to contours identified in the training data. In this case, tracking would actually amount to following or tracing one or more contours, given an initial starting point, rather than tracking a contour which changes with time.

With respect to tracking patterns as a function of frequency, the present invention can track or identify particular frequency or spectra patterns. Such patterns include, for example, frequency components of a Fourier transform of a time-based signal or the frequency components in a spectral analysis of acceleration data or any other time-based signal, etc. Again, in accordance with the present invention, all that is required for tracking such patterns is a frequency-based data file for training from which frequency-based exemplar patterns can be extracted along with a distance function for determining a distance between the extracted frequency-based exemplars.

Probabilistic exemplar-based pattern tracking according to the present invention begins by analyzing training data which is either live, or previously recorded and stored to a computer readable media. Analysis of the training data serves to identify a training set of exemplars that will later form the basis for the probabilistic tracking. Extraction of the exemplars from the training data is done using any of a number of conventional techniques, such as those mentioned above, i.e., edge detection, images patches, etc. The particular exemplar identification technique used is, of course, dependent upon the type of data being analyzed. Such techniques are well known to those skilled in the art.

The training set is assumed to be approximately aligned from the outset (this is easily achieved in cases where the training set is, in fact, easy to extract from raw data). Conventional transforms, such as scaling, translation and rotation techniques, are also used in an alternate embodiment to ensure that the exemplars of the training set are aligned. Once the exemplar training set has been aligned, the exemplars are clustered, in the conventional statistical sense, into any desired number, k, of clusters. For example, one common clustering technique is known as k-medoids clustering. The k-medoids clustering technique is useful for generating clusters of similar exemplars, with a single medoid exemplar representing each cluster. The k-medoids clustering technique is an iterative process which converges on a stable medoid solution after a number of iterations.

The k-medoids clustering process is based on computed distances between exemplars. As noted above, any conventional distance analysis technique appropriate to a particular data type can be used in a system and method according to the present invention. For example, also as noted above, two useful distance measurements include the chamfer distance for determining the distance between unparameterized curves such as the aforementioned contours, and the shuffle distance for determining the distance between images or image patches.

Once the exemplars have been clustered, and the centers of each cluster, i.e., the medoids, have been identified, "metric exponentials" are computed for each cluster. These metric exponentials involve a novel approach for estimating dimensionality and an exponential constant for each cluster. Note that computation of the dimensionality and exponential constant is necessary in order to use the exemplars in a probabilistic tracking framework. As is well known to those skilled in the art, if the exemplars existed in a vector space, such that relationships between the exemplars were known, such computations would not be necessary, as they could be readily determined via conventional Gaussian modeling, PCA, k-means, EM, or any of a number of other related techniques. However, because the assumption is made, as noted above, that any such relationship is unknown, the aforementioned metric exponentials must first be estimated in order to allow conventional probabilistic treatments of the exemplars. One benefit of the assumption that exemplars exist in a non vector space is that the construction of explicit models and computationally expensive analysis is avoided.

The metric exponentials of each exemplar are then multiplied by a prior probability to generate an observation likelihood function. The observation likelihood functions for each exemplar are then used in a conventional tracking system for tracking continuous patterns in a sequence of images, as well as in space or frequency.

In view of the preceding discussion, it is clear that the system and method of the present invention is applicable to tracking any continuous pattern. Note that such tracking also includes tracking patterns as a function of space, or frequency. However, for ease of explanation, the detailed description provided herein focuses on using exemplars for probabilistic tracking of patterns in a sequence of images, and in particular, to probabilistic exemplar-based tracking of walking or running people and facial motions, i.e., mouth and tongue motions, in sequences of images. However, it should be clear to those skilled in the art that the concepts described herein are easily extensible to probabilistic exemplar-based tracking of patterns in both space and frequency domains.

In addition to the just described benefits, other advantages of the present invention will become apparent from the detailed description which follows hereinafter when taken in conjunction with the accompanying drawing figures.

DESCRIPTION OF THE DRAWINGS

The patent or application file contains at least one drawing executed in color. Copies of this patent or patent application publication with color drawing(s) will be provided by the Office upon request and payment of the necessary fee. The specific features, aspects, and advantages of the present invention will become better understood with regard to the following description, appended claims, and accompanying drawings where:

FIGS. 11A through 11H provide best exemplar matches to input target data for image patches using various distance functions in a working example of the present invention.

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
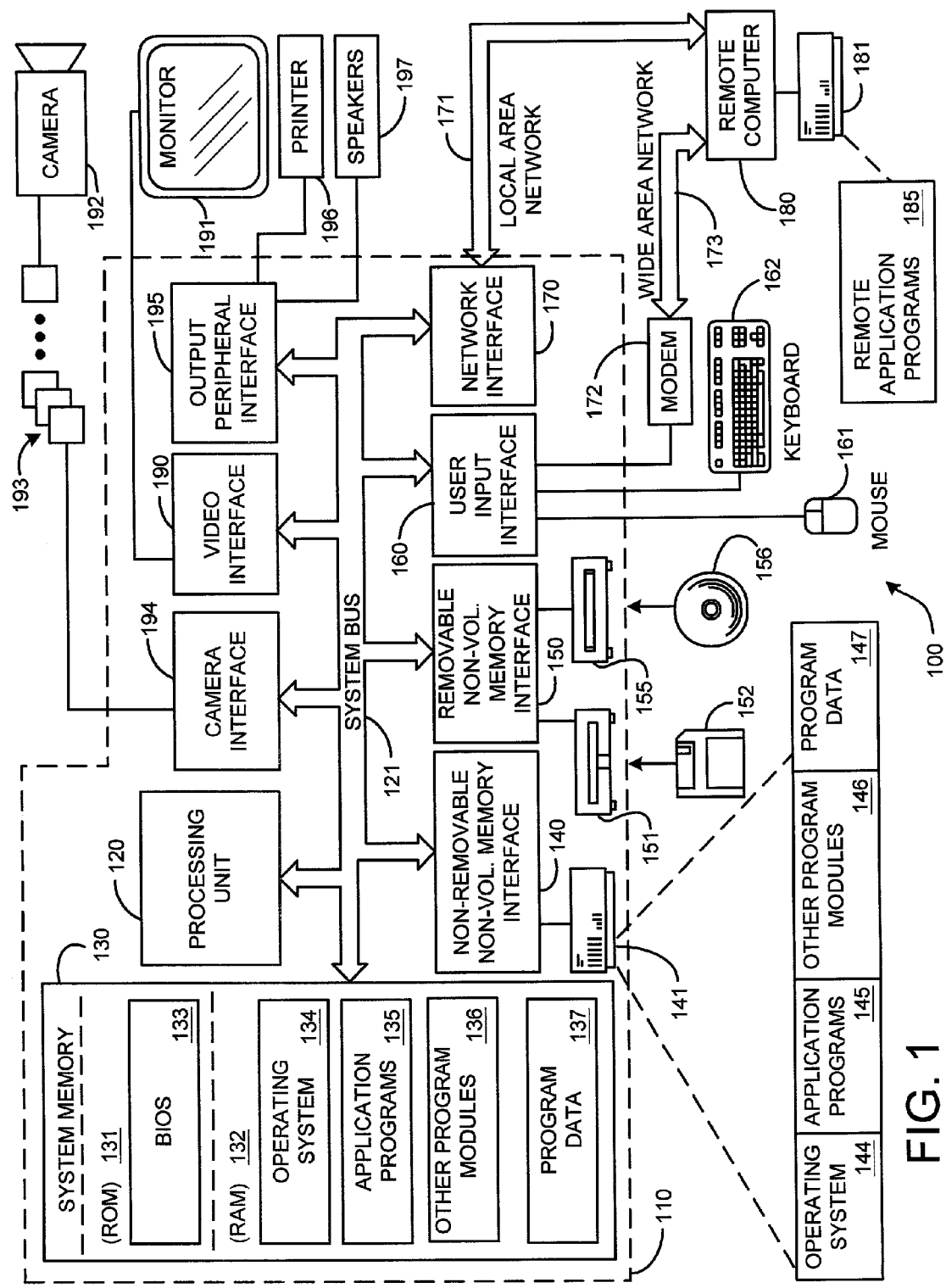
FIG. 1 is a general system diagram depicting a general-purpose computing device constituting an exemplary system for implementing the present invention.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras could be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194. This interface is connected to the system bus 121, thereby allowing the images 193 to be routed to and stored in the RAM 132, or any of the other aforementioned data storage devices associated with the computer 110. However, it is noted that image data can be input into the computer 110 from any of the aforementioned computer-readable media as well, without requiring the use of a camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying the present invention.

2.0 Introduction:

A probabilistic exemplar-based tracking system and method according to the present invention is useful for tracking patterns and objects in a sequence of images, and in both the space, and frequency domains.

2.1 System Overview:

In general, a system and method according to the present invention operates to track patterns or objects using a probabilistic exemplar-based tracking approach. Tracking is accomplished by first extracting a training set of exemplars from training data. The exemplars are then clustered using any of a number of conventional cluster analysis techniques based on a distance function for determining the distance or similarity between the exemplars. Such clustering techniques include, for example, k-medoids clustering. A dimensionality for each exemplar is then estimated and used for generating a probabilistic likelihood function for each exemplar cluster. Any of a number of conventional tracking algorithms is then used in combination with the exemplars and the probabilistic likelihood functions for tracking patterns or objects in a sequence of images, or in either the space, or frequency domains.

2.2 Tracking Patterns and Objects:

Probabilistic exemplar-based pattern tracking according to the present invention begins by analyzing training data which is either live, or previously recorded and stored to a computer readable media. Analysis of the training data serves to identify a training set of exemplars that will later form the basis for the probabilistic tracking as described in Section 3.0. Extraction of the exemplars from the training data is done using any of a number of conventional techniques, such as those mentioned in the following sections. Such techniques are well known to those skilled in the art. The particular exemplar identification technique used is, of course, dependent upon the type of data being analyzed, i.e. patterns in a sequence of images, space-domain tracking, or frequency-domain tracking, as described below.

2.2.1 Tracking Patterns in a Sequence of Images:

Spatial tracking of objects typically relies on analysis of a series or sequence of images having target objects such as people, particular facial features, or any other visible object or pattern, which is to be tracked or identified. In accordance with the operation of a system and method according to the present invention, as described in Section 3.0 below, all that is required for tracking patterns or objects in a video file or a sequence of image files is a training data set from which conventional visual exemplar patterns can be extracted along with a distance function for determining a distance between the extracted exemplars.

In a working embodiment of the present invention, described in greater detail below in Section 4.0, one or more persons are tracked through a sequence of images using contour exemplars derived through edge detection of training data. Note that contour exemplars are only one of many types of exemplars that can be used for visual or spatial tracking of patterns or objects according to the present invention. Other conventional visual exemplars that can be used for pattern or object tracking include patterns based on pixel brightness, pixel color, pixel intensity, image patches, or any of a number of other conventional statistics or parameters that can be used to define or describe elements of the training data. Distance functions for determining a distance between unparameterized curves such as the aforementioned contours include a conventional "chamfer distance." Distance functions for determining a distance between image patches include a "shuffle distance." These concepts are described in further detail below in Section 4.0.

2.2.2 Tracking in a Space Domain:

With respect to tracking patterns as a function of space, the present invention can track or identify particular patterns in space using any of a number of techniques. Such patterns can be tracked or identified in static images, rather than in a sequence of images, as described above. For example, in tracking or identifying patterns in space, a contour in a static image can be tracked or tracked or traced using, exemplars composed of intensity profiles of a segment of pixels perpendicular to contours identified in the training data. In this case, tracking would actually amount to following or tracing one or more contours, given an initial starting point, rather than tracking a contour which changes with time. Again, in accordance with the operation of a system and method according to the present invention, as described in Section 3.0 below, all that is required for tracking such patterns is a space-based data file, such as a static image file for training from which exemplar patterns are extracted along with a distance function for determining a distance between the extracted exemplars.

2.2.3 Tracking in a Frequency Domain:

With respect to tracking patterns as a function of frequency, the present invention can track or identify particular frequency or spectra patterns. Such patterns include, for example, frequency components of a Fourier transform of a time-based signal or the frequency components in a spectral analysis of acceleration data or any other time-based signal, etc. Again, in accordance with the operation of a system and method according to the present invention, as described in Section 3.0 below, all that is required for tracking such patterns is a frequency-based data file for training from which frequency-based exemplar patterns are extracted along with a distance function for determining a distance between the extracted frequency-based exemplars.

2.3 Extraction and Clustering of Exemplars:

Generally speaking, an exemplar is basically a model or a pattern, which in the case of this invention, is derived or extracted from a training source or input. In other words, an exemplar can be defined as a standard template or prototype for a particular class of patterns. Any conventional technique for extracting exemplars from a source of training data may be used to generate the set of exemplars used for subsequent pattern or object tracking, as described below.

For example, exemplars useful for tracking a walking person include contours, i.e., outlines, of a person in different walking positions. Conventional background subtraction and edge detection techniques used to process a series of training images will produce a training set of exemplars that are contours of a walking person. However, it should be noted that this invention is not limited to visual tracking of objects in images. In fact, as described herein, the present invention is capable of tracking both patterns and objects. Further, as noted above, such tracking also includes tracking or identification of any continuous pattern that is a function of space or frequency.

The set of exemplars extracted from the training data is assumed to be approximately aligned from the outset (this is easily achieved in cases where the training set is, in fact, easy to extract from raw data, such as with the aforementioned background subtraction/edge detection process described above). Conventional transforms, such as scaling, translation and rotation techniques, are also used in an alternate embodiment to ensure that the exemplars of the training set are aligned.

Once the exemplar training set has been aligned, the exemplars are clustered, in the conventional statistical sense, into any desired number, k, of clusters. For example, one well known clustering technique is known as k-medoids clustering. The k-medoids clustering technique is useful for generating clusters of similar exemplars, with a single medoid exemplar representing each cluster's center. The k-medoids clustering technique is an iterative process which converges on a stable medoid solution after a number of iterations.

The k-medoids clustering process is based on computed distances between exemplars. As noted above, any conventional distance analysis technique appropriate to a particular data type can be used in a system and method according to the present invention. For example, as noted above, two useful distance measurements include the conventional chamfer distance for determining the distance between unparameterized curves such as the aforementioned contours, and the conventional shuffle distance for determining the distance between images or image patches.

2.4 Generation of Observation Likelihood Functions:

In general, the observation likelihood function represents the probability or likelihood that a particular exemplar will be observed in a particular way. In vector space, determination of the observation likelihood function is typically accomplished by fitting a Gaussian to each cluster of exemplars for determining the dimensionality of the exemplars. However, as noted above, the exemplars are assumed to not necessarily have a known representation in a vector space. Consequently, other methods must be used to determining the dimensionality of the exemplars in order to generate the observation likelihood function for the exemplar clusters.

Therefore, in accordance with the present invention, the observation likelihood function is computed from an application of the distance function. For example, as noted above, there is a single exemplar at the center of each cluster, with a known distance to all of the other exemplars in that cluster. Given this information, an observation likelihood function is computed for each cluster that allows computation of the probability that a particular exemplar produced a particular observation by estimating the dimensionality of the exemplar clusters.

In one embodiment, this observation likelihood function is computed for each cluster by fitting a Gamma or scaled chi-squared distribution to the distribution of distances from the exemplar to all other points in the cluster. This process produces an estimate for the local dimensionality of the cluster, rather than an explicit dimensionality which could be determined if the exemplars existed in a vector space. Given this information, an observation likelihood function is computed for each cluster. In another embodiment, a multidimensional scaling technique is used to estimate the dimensionality of exemplars in each cluster. Again, given this information, along with the known distance to all of the other exemplars in that cluster, an observation likelihood function is computed for each cluster. These concepts are discussed in greater detail below in Section 3.0.

2.5 Tracking Paradigm:

Once the observation likelihood functions have been computed for each exemplar cluster, they are used in a conventional tracking system for tracking continuous patterns in sequences of images, as well as in space and frequency. In general, during tracking, the observation likelihood function for each cluster is used in conjunction with the data being analyzed for pattern tracking to hypothesize several possible states for the pattern being tracked. For example, in the case of visual tracking of a person in a sequence of images, the possible states may represent a position and location of the person in the image. Then, for each hypothesis, the probability that a particular exemplar generated a particular part of the data being analyzed is computed. Finally, this probability is combined with any available prior knowledge regarding the probability of each of the hypotheses to determine a probability that is proportional to the end result of the pattern tracking. These concepts are described in greater detail below in section 3.0.

Figure 2:
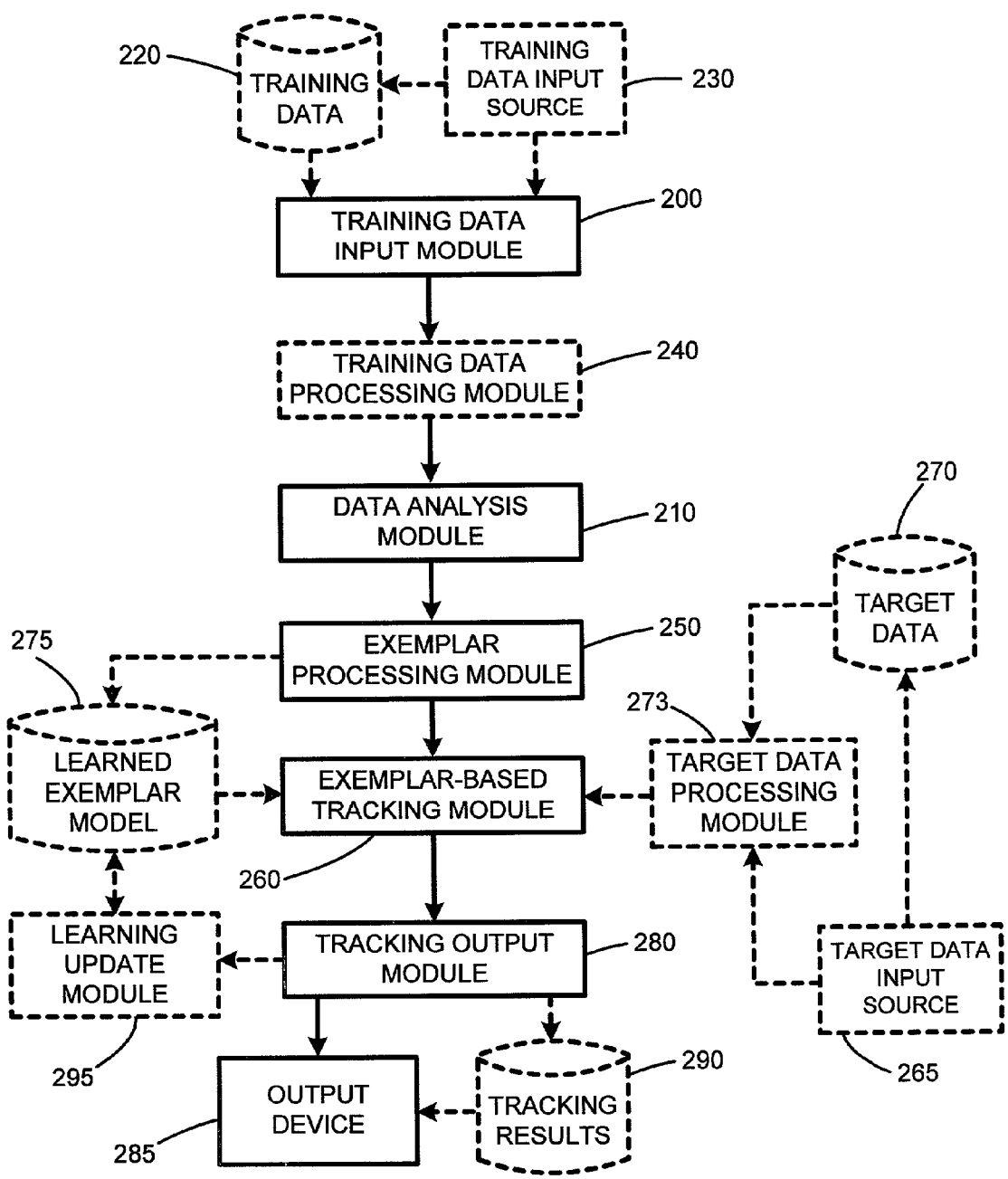
FIG. 2 illustrates an exemplary architectural diagram showing exemplary program modules for implementing the present invention.

2.6 System Architecture:

The process summarized above is illustrated by the general system diagram of FIG. 2. In particular, the system diagram of FIG. 2 illustrates the interrelationships between program modules for implementing probabilistic exemplar-based tracking of patterns or objects in accordance with the present invention. It should be noted that the boxes and interconnections between boxes that are represented by broken or dashed lines in FIG. 2 represent alternate embodiments of the present invention, and that any or all of these alternate embodiments, as described below, may be used in combination with other alternate embodiments that are described throughout this document.

In particular, as illustrated by FIG. 2, a system and method in accordance with the present invention begins by using a training data input module 200 to retrieve training data which is to be analyzed by a data analysis module 210 for the purpose of extracting or generating a set of exemplars. In one embodiment, the training data input module 200 retrieves the training data from a database or directory 220 containing at least set of training data. Alternately, in another embodiment, the training data input module 200 accepts training data directly from a training data input source 230, such as, for example, a digital camera, a microphone, an accelerometer, or any other sensing device for gathering training data appropriate to the domain being analyzed, (i.e., image sequences, spatial data, or frequency data). Further, in another embodiment, a training data processing module 240 processes the training data, to provide the data in a desired format before the training data is provided to the data analysis module 210.

Once the training data has been provided to the data analysis module 210, the data is analyzed and processed to extract exemplars representative of the pattern or object to be tracked. The data analysis module 210 then provides a set of the representative exemplars to an exemplar processing module 250. The exemplar processing module 250 performs two functions. First, the exemplar processing module 250 aligns and iteratively clusters the exemplars into a desired number of clusters, with each cluster having a representative exemplar at its "center." Second, the exemplar processing module 250 estimates "metric exponentials" for each of the exemplar clusters. In general, the metric exponentials for the exemplar clusters define both the dimensionality of each of the clusters, as well as an exponential constant. These metric exponentials, in combination with the representative exemplar at the center of each cluster constitute observation likelihood functions for each exemplar cluster. Both the metric exponentials and the observation likelihood functions are described in greater detail in Section 3 below.

Once the metric exponentials have been estimated by the exemplar processing module 250 to form the observation likelihood functions, the exemplar processing module passes those observation likelihood functions to an exemplar-based tracking module 260. Target data which is to be analyzed for the purpose of tracking patterns or objects of interest is also passed to the exemplar-based tracking module 260. This target data is passed to the exemplar-based tracking module 260 either directly from a target data input source 265, such as, for example, a video input device or other sensing device, or from a database or other electronic file 270 containing target data.

Note that in an alternate embodiment, as with the training data provided to the training data processing module 240, a target data processing module 273 processes the target data to provide the data in a desired format before the target data is provided to the exemplar-based tracking module 260. For example, where tracking of frequency-domain patterns is desired from an acceleration data input, a spectral analysis or other conventional frequency analysis of the acceleration data input is first performed to provide frequency-domain target data. Clearly, any number or type of conventional data processing techniques may be performed on any type of input data to provide target data in the desired domain.

Further, in still another embodiment, the exemplar processing module 250 passes the learned observation likelihood functions to a learned exemplar model database 275. The learned observation likelihood functions can then be stored in the database 275 and recalled for later use at any time by the exemplar-based tracking module 260.

As noted above, the exemplar-based tracking module 260 used the observation likelihood functions to probabilistically track patterns or objects of interest. As the patterns or objects are tracked, the tracking results are provided to a tracking output module 28 where the results are either provided to a user via a conventional output device 285, such as a display or a printer, or alternately the tracking results are stored on a computer readable media 290 for later use.

Finally, in still another embodiment, the results of the tracking output module 280 are passed to a learning update module 295 which uses conventional probabilistic learning techniques to update the learned exemplar model 275 which is then provided back to the exemplar-based tracking module 280 in an iterative process.

3.0 System Operation:

In view of the preceding discussion, it is clear that the system and method of the present invention is applicable to tracking any continuous pattern in a sequence of images, or as a function of space or frequency. However, for ease of explanation, the detailed description provided herein focuses on using exemplars for probabilistic tracking of patterns in a sequence of images, and in particular, to probabilistic exemplar-based tracking of people walking in a sequence of images. However, it should be clear to those skilled in the art that the concepts described herein are easily extensible to probabilistic exemplar-based tracking of patterns in both the space and frequency domains in accordance with the present invention.

3.1 Pattern-Theoretic Tracking:

As noted above, the basic premise of the present invention is to provide a system and method for probabilistic exemplar-based pattern tracking. For example, in accordance with the present invention a given image sequence Z comprised of images $\{z_1, \ldots, z_T\}$ is analyzed in terms of a probabilistic model learned from a training image sequence Z* comprised of images $\{z^*_1, \ldots, z^*_T\}$. Note that images may be preprocessed for ease of analysis, for example by filtering to produce an intensity image with certain features (e.g., ridges) enhanced, or nonlinearly filtered to produce a sparse binary image with edge pixels marked. A given image z is to be approximated, in the conventional pattern theoretic manner, as an ideal image or object x∈X that has been subjected to a geometrical transformation $T_\alpha$ from a continuous set α∈A, i.e.:

$$z \approx T_\alpha x \quad \text{Equation 1}$$

3.1.1 Transformations and Exemplars:

The partition of the underlying image space into the transformation set A and class X of normalized images can take a variety of forms. For example, in analysis of face images, A may be a shape space, modeling geometrical distortions, and X may be a space of textures. Alternatively, A may be a space of planar similarity transformations, leaving X to absorb both distortions and texture/shading distributions. In any case, A is defined analytically in advance, leaving X to be inferred from the training sequence Z*. Further, as noted above, the class X of normalized images is not assumed to be amenable to straightforward analytical description; instead X is defined in terms of a set $\{\tilde{x}_k, k=1, \ldots, K\}$ of exemplars, together with a distance function ρ. For example, the face of a particular individual can be represented by a set of exemplars $\tilde{x}_k$ consisting of normalized (registered), frontal views of that face, wearing a variety of expressions, in a variety of poses and lighting conditions. In accordance with the present invention, these exemplars will be interpreted probabilistically, so that the uncertainty inherent in the approximation of Equation 1 is accounted for explicitly. The interpretation of an image z is then as a state vector X=(α, k).

3.1.2 Learning:

Aspects of the probabilistic model that are learned from Z* include:

1. The set of exemplars $\{\tilde{x}_k, k=1, \ldots, K\}$;
2. Component distributions, centered on each of the $T_\alpha \tilde{x}_k$, for some α for observations z; and
3. A predictor in the form of a conditional density $p(X_t | X_{t-1})$ to represent a prior dependency between states at successive timesteps.

These elements, together with a prior $p(X_1)$, form a structured prior distribution for a randomly sampled image sequence $z_1, \ldots, z_T$, which is can be tested for plausibility by random simulation. The prior model then forms a basis for interpretation of image sequences via the posterior $p(X_1, X_2, \ldots | z_1, z_2, \ldots; \Lambda)$, where Λ is a set of learned parameters of the probabilistic model, including the exemplar set, noise parameters, and a dynamic model.

Figure 3:
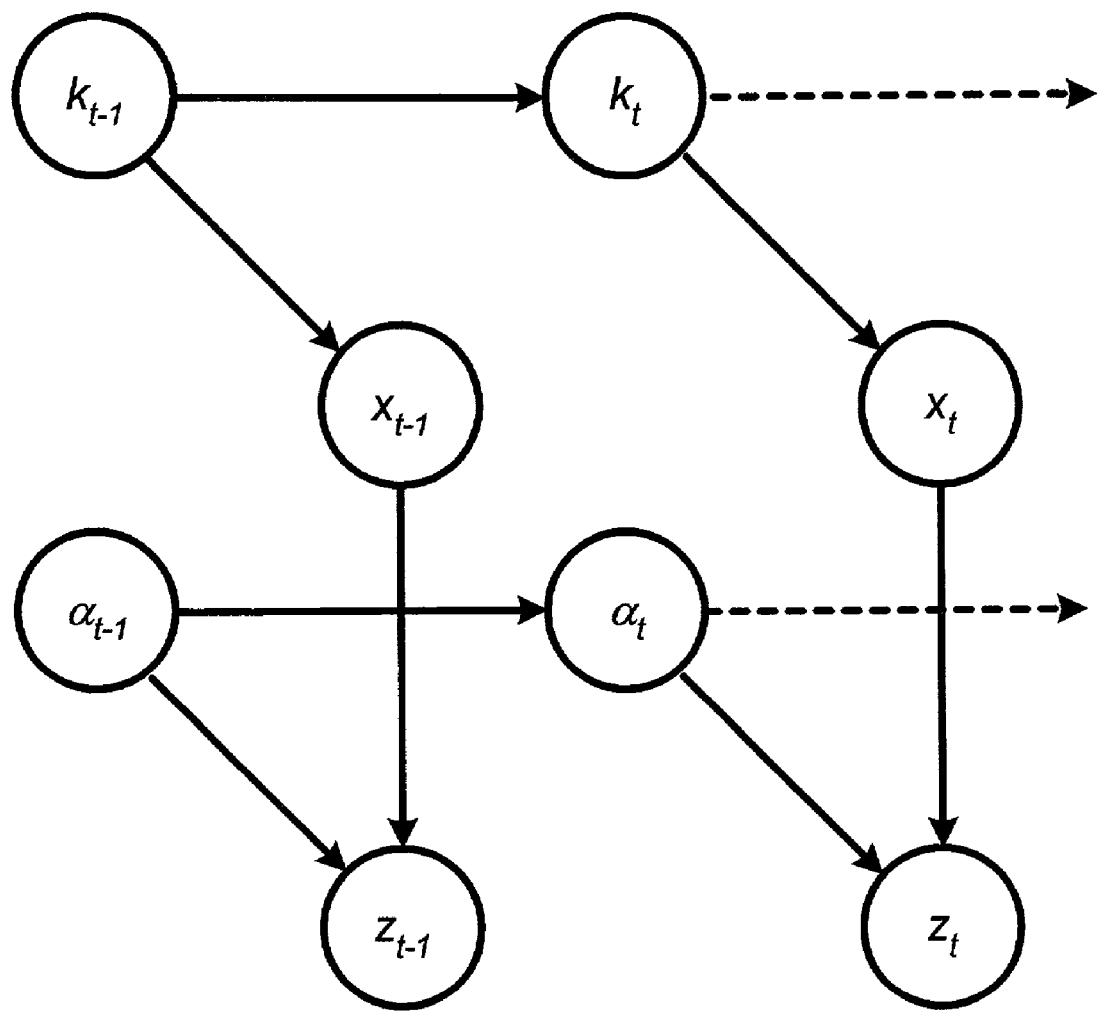
FIG. 3 illustrates an exemplary probabilistic graphical structure for a metric mixture model according to the present invention.

3.2 Probabilistic Modeling of Images and Observations:

In accordance with the present invention, probabilistic modeling of images and observations is achieved using a "Metric Mixture" ($M^2$) approach. The $M^2$ approach is described in further detail below in Section 3.2.3. FIG. 3 provides a graphical representation of the probabilistic structure of the $M^2$ model. In particular, as illustrated by FIG. 3, an observation z at time t is an image drawn from a "mixture" having centers $\tilde{x}_k, k=1, \ldots, K_1$ where $\tilde{x}_k, k=1, \ldots, K$ are exemplars, and z is a geometrical transformation, indexed by a real-valued parameter α.

3.2.1 Objects:

An object in the class X is taken to be an image that has been preprocessed to enhance certain features, resulting in a preprocessed image x. The $M^2$ approach is general enough to apply to a variety of such images, such as, for example, unprocessed raw images, and sparse binary images with true-valued pixels marking a set of feature curves.

3.2.1.1 Image Patches:

In the case of real-valued output from preprocessing, z is an image subregion, or patch, visible as an intensity function $I_z(r)$. As mentioned earlier, it is undesirable to have to assume a known parameterization of the intensity function on that patch. For now, we make the conservative assumption that some linear parameterization, with parameters $y \in R^d$, of a priori unknown form and dimension d, exists, so that:

$$I_z(r) = \sum_{i=1}^{d} I_i(r) y_i \quad \text{Equation 2}$$

where $I_1(r), \ldots, I_d(r)$ are independent image basis functions and $y=(y_1, \ldots, y_d)$. Given the linearity assumption, all that need be known about the nature of the patch basis is its dimensionality d. There is no requirement to know the form of the $I_i$. A suitable distance function $\rho$ is needed for patches. For robustness in a working embodiment of the present invention, a conventional "shuffle distance" was used for the distance function, in which each pixel in one image is first associated with the most similar pixel in a neighborhood around the corresponding pixel in the other image. As noted above, other conventional distance functions may also be used.

3.2.1.1 Curves:

In another working embodiment of the present invention, described in Section 4.0, contours (binary images) were used as exemplars for probabilistic tracking. The situation for such binary images is similar to that for patches, except that a different distance function is needed, and the interpretation of the linear parameterization is slightly different. In this case, z is visible as a curve $r_z(s)$, with curve parameter s, and is linearly dependent on $y \in R^d$, so that:

$$r_z(s) = \sum_{i=1}^{d} r_1(s) y_1 \quad \text{Equation 3}$$

where $r_1(s), \ldots, r_d(s)$ are now independent curve basis functions such as parametric B-splines. In this case, the distance measure $\rho(x, \tilde{x})$ used is a non-symmetric "chamfer" distance. The chamfer distance can be computed directly from the binary images x and $\tilde{x}$, using a chamfer image constructed from $\tilde{x}$, and without recourse to any parametric representation of the underlying curves. Note that the chamfer distance is described in greater detail in Section 3.2.3.3.

3.2.2 Geometric Transformations:

Geometric transformations $\alpha \in A$ are applied to exemplars to generate transformed mixture centers $$\tilde{z} = T_\alpha \tilde{x}.$$

For example, in the case of Euclidian similarity, $\alpha = (u, \theta, s)$, and vectors transform as:

$$T_\alpha r = u + R(\theta) s r,$$

in which (u, $\theta$, s) are offset, rotation angle, and scaling factor respectively. Where the observations are curves, this induces a transformation of:

$$r_z(s) = T_\alpha r_x(s),$$

and in the case of image patches, the transform is:

$$I_z(T_\alpha r) = I_x(r).$$

3.2.3 Metric Mixture ($M^2$) Model:

The Metric Mixture ($M^2$) approach combines the advantages of exemplar-based models with a probabilistic framework into a single probabilistic exemplar-based pattern tracking system and method according to the present invention. The $M^2$ model has several valuable properties. Principally, it provides alternatives to standard learning algorithms by allowing the use of metrics that are not embedded in a vector space. Further, the $M^2$ model allows both pattern or object models and noise models to be learned automatically. Finally, unlike conventional schemes using Markov random field (MRF) models of image-pixel dependencies, the $M^2$ model allows metrics to be chosen without significant restrictions on the structure of the metric space.

Given the background discussion of the preceding Sections (see Section 3.1 through Section 3.2.2), the observation likelihood functions at the core of the $M^2$ approach can now be described. In general, the $M^2$ approach makes use of the fact that only enough need be known about the probability distribution of an image z with respect to the set of exemplars, X, i.e., p(z|X), to simply evaluate that probability distribution rather than actually sampling from it. Consequently, unlike other probabilistic tracking schemes, no constructive form for the observer need be given. Further, because the probability distribution is merely evaluated rather than actually sampled, any potential concern over pixelwise independence is avoided entirely.

3.2.3.1 Exemplars as Mixture Centers:

As is well known to those skilled in the art, if the exemplars existed in a vector space, such that relationships between the exemplars were known, the dimensionality of the exemplars could be readily calculated via conventional Gaussian modeling, PCA, k-means, EM, or any of a number of other related techniques. However, because the assumption is made, as noted above, that any such relationship is unknown, the dimensionality must first be estimated in order to allow conventional probabilistic treatments of the exemplar clusters. One benefit of the assumption that exemplars exist in a non-vector space is that the construction of explicit models and computationally expensive analysis is avoided.

In using particular exemplars as mixture centers, the aforementioned object class, X, is defined in terms of a set, $X = \{\tilde{x}_k, k=1, \ldots, K\}$, of untransformed exemplars which is inferred or extracted from the training set $Z^*$. A transformed exemplar, $\tilde{z}$, serves as center in a mixture component, as illustrated by Equation 4:

$$p(z|X) \propto \frac{1}{Z} \exp - \lambda \rho(z, \tilde{z}) \quad \text{Equation 4}$$

which represents a "metric exponential" distribution whose normalization constant or "partition function" is Z.

3.2.3.2 Metric-Based Mixture Kernels:

For tracking of the full state of an object in a sequence of images, i.e., both motion and shape of the object, the probabilistic hypothesis becomes $X = (\alpha, k)$. Consequently, the aforementioned mixture model produces an observation likelihood that can be expressed by Equation 5 as:

$$p(z|X) \equiv p(z|\alpha, k) \propto \frac{1}{z} \exp - \lambda \rho(z, T_\alpha \tilde{x}_k) \quad \text{Equation 5}$$

where $\lambda$ represents the exponential parameter for the training data. In the case where only motion is to be tracked, rather than both motion and shape, the probabilistic hypothesis is simply $X = \alpha$. Consequently, the observation likelihood of Equation 5 becomes:

$$p(z|\alpha) \propto \sum_{i=1}^{n} \pi_k \frac{1}{z} \exp - \lambda \rho(z, T_\alpha \tilde{x}_k) \quad \text{Equation 5A}$$

which defines a mixture with component priors $\pi_k$.

3.2.3.3 Partition Function:

In order to learn the value of the exponential parameter, $\lambda$, from the training data, it is necessary to know something about the partition function Z. For example, as noted above, the distance function ρ can be a quadratic chamfer function as illustrated by Equation 6:

$$\rho(z,\tilde{z}) = \min_{s'(s)} \int ds\, g(|r_z(s') - r_{\tilde{z}}(s)|), \quad \text{Equation 6}$$

where $g(|r_z(s')-r_{\tilde{z}}(s)|)$ is the profile of the chamfer. In the case of a quadratic chamfer, in which $g(u)=u^2$, or a truncated form $g(u)=\min(u^2, g_0)$, the chamfer distance is known to approximate a curve-normal weighted L2 distance between the two curves, in the limit that they are similar. Note that the chamfer distance is related to the Hausdorff distance, which has been used in conventional tracking systems. The difference between the chamfer distance and the Hausdorff distance is that the integral in Equation 6 becomes a max operator in the Hausdorff distance. One advantage of the chamfer distance is that it can be computed directly from the binary images z, and $\tilde{z}$ as:

$$\rho(z,\tilde{z}) = \int ds\, \gamma(z, r_{\tilde{z}}(s)), \quad \text{Equation 6A}$$

using a chamfer image:

$$\gamma(z,r) = \min_{s'} g(|r_z(s') - r|), \quad \text{Equation 6B}$$

constructed directly from binary image z. This allows $\rho(z,\tilde{z})$ to be evaluated repeatedly for a given z, and various $\tilde{z}$ directly from Equation 6A, which being simply a curve integral (approximated) is numerically very efficient. Similarly, an $L_2$ norm on image patches leads to a Gaussian mixture distribution. In that case, the exponential constant, λ, in the observation likelihood function is interpreted as $$\lambda = \frac{1}{2\sigma^2},$$

where σ is an image-plane distance constant, and the partition function is $Z \propto \sigma^d$. From this, it can be shown that the chamfer distance $\rho|\tilde{z} \equiv \rho(z,\tilde{z})$ is a $\sigma^2 \chi_d^2$ random variable (i.e., $\rho/\sigma^2$ has a chi-squared, $\chi_d^2$, distribution). This allows the parameters of σ and d of the observation likelihood function of Equation 5 to be learned from the training data as described in Section 3.3.2 below.

Figure 4:
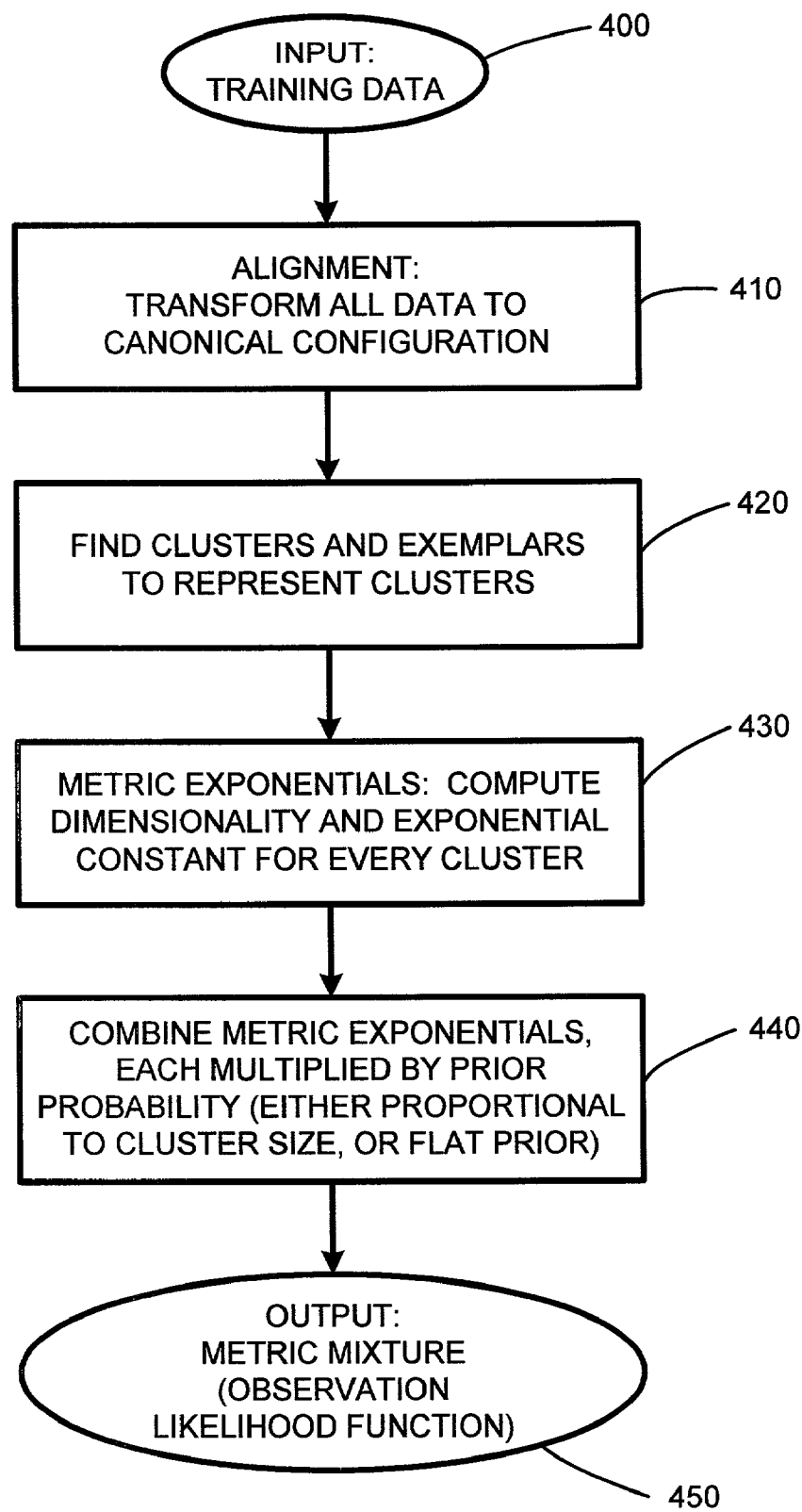
FIG. 4 illustrates an exemplary system flow diagram for learning metric mixture observation likelihood functions according to the present invention.

3.3 Learning:

The following sections describe learning of mixture kernel centers and $M^2$ kernel parameters. In addition, the processes described below are summarized in FIG. 4 which illustrates an exemplary system flow diagram for learning metric mixture observation likelihood functions according to the present invention. The flow diagram of FIG. 4 shows that given a training data input 400, the exemplars extracted from that training data are aligned 410. Once aligned, the exemplars are clustered and the exemplars representing a center of each cluster is identified 420. Next, the dimensionality and exponential constant, i.e., the "metric exponentials" are estimated for each cluster 430. The metric exponentials are then combined and multiplied by a prior probability which is either proportional to the cluster size, or simply a flat prior 440. Finally, an output likelihood function estimated based on exemplar distances is output 450 for use in probabilistic tracking.

Figure 5:
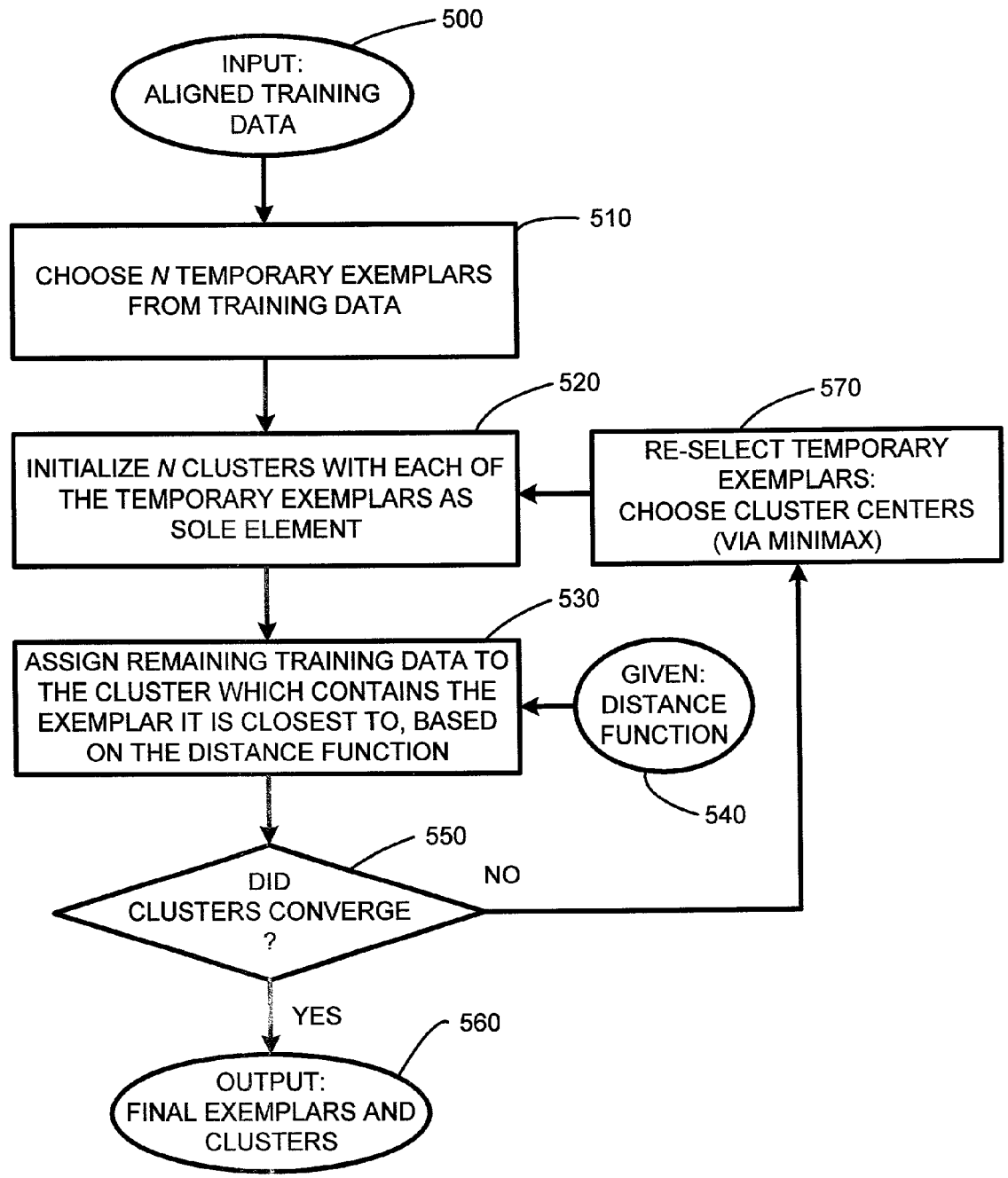
FIG. 5 illustrates an exemplary system flow diagram for clustering exemplars using a k-medoids algorithm according to the present invention.

3.3.1 Learning Mixture Kernel Centers:

In general, as illustrated by FIG. 5, learning the mixture kernel centers involves a series of steps for clustering exemplars and probabilistically weighting the cluster centers. First, it is assumed that the training set is aligned 500, as discussed above. Alternatively, the exemplars in the training set can be aligned using conventional linear transformations as described above. Alignment of the exemplars allows a determination of where the centers are for each of the clusters.

Next, a determination of the number of clusters, k, to be used is made. In a working example according to the present invention, described in Section 4.0, thirty exemplar clusters were used for successfully tracking walking people in a sequence of images. Then, k temporary exemplars $\tilde{x}_k$ are randomly selected from the set of all exemplars as initial guesses for what the cluster centers will be 510 and 520. Each of the remaining exemplars is then assigned to one of the k temporary exemplars 530. The assignment is done by measuring the distance between each remaining exemplar and each of the temporary exemplar, and matching the remaining exemplars with the closest temporary exemplar according to the distance function. This matching is repeated for all remaining exemplars in the training data to create k clusters of exemplars.

Once the initial clusters have been created, for each cluster, a new temporary exemplar is chosen to represent each cluster. This is done by first measuring the distance 540 between all of the elements in a particular cluster then finding the exemplar in that cluster that best represents the cluster by finding the exemplar that is closest to the center of that cluster. In other words, the exemplar in a particular cluster that minimizes the maximum distance to all of the other elements in that cluster is chosen as the new temporary exemplar for representing that cluster. Each of the exemplars not representing the temporary centers is then reassigned to the closest temporary exemplar according to the distance function as described above.

This process is repeated 570 for several iterations until the clusters are stable. In other words, the process is repeated until the clusters converge 550. Once the clusters have converged, the temporary exemplars $\tilde{x}_k$ are saved as the final representative exemplars 560.

Note that clustering technique described above is implemented using a conventional k-medoids algorithm. With the conventional k-medoids algorithm, instead of taking the mean value of the objects in a cluster as a reference point, the "medoid" is used. The medoid is simply the most centrally located object in a cluster of similar objects. The basic strategy with the k-medoids algorithm is to find k clusters in n objects by first arbitrarily finding a representative object (the medoid) for each cluster. Each remaining object is then clustered with the medoid to which it is the most similar. This strategy iteratively replaces one of the medoids by one of the non-medoids as long as the quality of the resulting clustering is improved. The quality is estimated using a cost function that measures the average dissimilarity between an object and the medoid of its cluster. Note that the k-medoids algorithm is similar to the k-means algorithm which is well known to those skilled in the art, and will not be described in further detail herein.

Finally, probabilistic mixture weights are assigned to each of the each of the representative exemplars. In general, this mixture weight represents the probability that any particular exemplar appears as opposed to any other.

In particular, following the probabilistic interpretation of exemplars as kernel centers $\tilde{x}_k$ as described with respect to Equation 4, the temporal continuity of the training sequence Z* is used to choose initial mixture centers, then proceed to iteratively cluster the exemplars until stable clusters are achieved. In view of this idea, the k-medoids clustering procedure summarized above for learning mixture kernel centers in accordance with the present invention is accomplished by a series of six steps, described below:

1. The training set is assumed to be approximately aligned from the outset (this is easily achieved in cases where the training set is, in fact, easy to extract from raw data). To improve the initial alignment, first a datum, $z^*_\mu$, is chosen such that it fulfills Equation 8 below with $C_k$ equal to the entire training set. Then, $$\alpha^*_t = \arg\min_\alpha \rho(T_\alpha^{-1} z^*_t, z^*_\mu) \text{ and } x^*_t = T_{\alpha^*_t}^{-1} z^*_t$$

which is minimized by direct descent.

2. To initialize centers, a subsequence of the $x^*_t$ is chosen to form the initial $\tilde{x}_k$, selected in such a way as to be evenly spaced in chamfer distance. Thus, the $\tilde{x}_k$ are chosen so that $\rho(\tilde{x}_{k+1}, \tilde{x}_k) \approx \rho_c$ for some appropriate choice of $\rho_c$ that gives approximately the required number K of exemplars.

3. For the remainder of the aligned training data $x^*_t, t=1 \ldots T^*$, find the cluster that minimizes the distance from $x^*_t$ to the cluster center as illustrated by Equation 7:

$$k_t(x^*_t) = \arg\min_k \rho(x^*_t, \tilde{x}_k) \qquad \text{Equation 7}$$

The set of all of the elements in cluster k is then identified as $C_k = \{x^*_t : k_t(x^*_t) = k\}$ and $N_k$ is set equal to $|C_k|$ 4. For each cluster k, find a new representative, which is the element in that cluster which minimizes the maximum distance to all of the other elements in that cluster. This concept is illustrated by Equation 8 as follows:

$$\tilde{x}_k \leftarrow \arg\min_{x \in C_\lambda} \max_{x' \in C_\lambda - \{x\}} \rho(x, x') \qquad \text{Equation 8}$$

5. Repeat steps 3 and 4 for a fixed number of iterations, or until the clusters converge, then save the final exemplars $\tilde{x}_k$.

6. Set mixture weights: $\pi_k \propto N_k$

Note that steps 3 and 4, implement the aforementioned k-medoids algorithm which is analogous are analogous to the iterative computation of cluster centers in the k-means algorithm, but adapted in accordance with the present invention to work in spaces where it is impossible to compute a cluster mean. Instead, an existing member of the training set is chosen by a minimax distance computation, since that is equivalent to the mean in the limit that the training set is dense and is defined over a vector space with a Euclidean distance.

3.3.2 Learning the $M^2$ Kernel Parameters:

Once the cluster centers have been learned, as described above, it is possible to learn the $M^2$ kernel parameters for completing the observation likelihood functions. In particular, in order to learn the parameters, $\sigma$ and d, of the observation likelihood functions, a validation set $Z_v$ is obtained. This validation set can simply be the training set Z less the unaligned exemplars $\{\tilde{z}_k\}$. For each $z_v$ from $Z_v$, the corresponding aligning transformation $\alpha_v$, and the mixture center $\tilde{x}_v$ is estimated by minimizing, by direct descent, the distance:

$$\min_{\alpha \in A, \tilde{x} \in X} \rho(z_v, T_\alpha \tilde{x}).$$

Next, in accordance with Section 3.2.3, the distances are treated by:

$$\rho_v(z_v) = \rho(z_v, T_{\alpha_v} \tilde{z}_v), z_v \in Z_v$$

as $\sigma^2 \chi_d^2$ distributed. An approximate, but simple approach to parameter estimation is via the sample moments:

$$\bar{\rho}_k = \frac{1}{N_k} \sum_{z_v \in C_\lambda} \rho_v(z_v) \text{ and } \bar{\rho}_k^2 = \frac{1}{N_k} \sum_{z_v \in C_\lambda} \rho_v^2(z_v),$$

which after manipulation for the chi-squared, $\chi^2$ mean and variance, give rise to the estimates for $d_k$ and $\sigma_k$ as illustrated by Equation 9:

$$d_k = \frac{\bar{\rho}_k^2}{\bar{\rho}_k^2 - \bar{\rho}_k^2} \text{ and } \sigma_k = \sqrt{\bar{\rho}_k / d} \qquad \text{Equation 9}$$

Alternatively, the full maximum likelihood solution, complete with integer constraint on d yields $\sigma$ values exactly as described above, and integer $d \geq 1$. It should also be noted that this estimation procedure is equivalent to fitting a fitting a fitting a $\Gamma$-distribution to $d_k$, with the value of d capturing the effective dimensionality of the local space in which the exemplars exist. Finally, note that as $\bar{\rho}_k$ increases, so does d; this is consistent with the statistician's intuition that Gaussians in higher-dimensional spaces hold more of their "weight" in the periphery than their lower-dimensional counterparts.

3.3.2.1 Multidimensional Scaling:

Multidimensional scaling is a conventional statistical technique which is used in an alternate embodiment to estimate the dimensionality of exemplar clusters for the purpose of learning the $M^2$ kernel parameters for completing the observation likelihood functions. In general, multidimensional scaling analysis estimates the dimensionality of a set of points, in this case, exemplars in a given cluster, given the distances between the points without knowing the structure of the space that the points are in. In other words, multidimensional scaling detects meaningful underlying dimensions for each cluster of exemplars that allows for a probabilistic explanation of observed similarities or dissimilarities, e.g., distances, between the exemplars in each cluster. Note that multidimensional scaling is well known to those skilled in the art, and will not be described in further detail herein.

3.3.3 Learning Dynamics:

In another embodiment, in learning dynamics for probabilistic pattern tracking, sequences of estimated $X_t$ from a training set are treated as if they were fixed time-series data, and used to learn two components of $p(X_t|X_{t-1})$; note that these components are assumed to be independent:
1. A Markov matrix M for $p(k_t|k_{t-1})$, learned by conventional histogramming transitions; and
2. A first order auto-regressive process (ARP) for $p(\alpha_t|\alpha_{t-1})$ with coefficient calculated using the conventional Yule-Walker algorithm.

The addition of such conventional learned dynamics to the pattern tracking capabilities of the present invention serves to allow for probabilistic pattern tracking even in the presence of noise, occlusions, or other disturbances in the tracked data.

Figure 6:
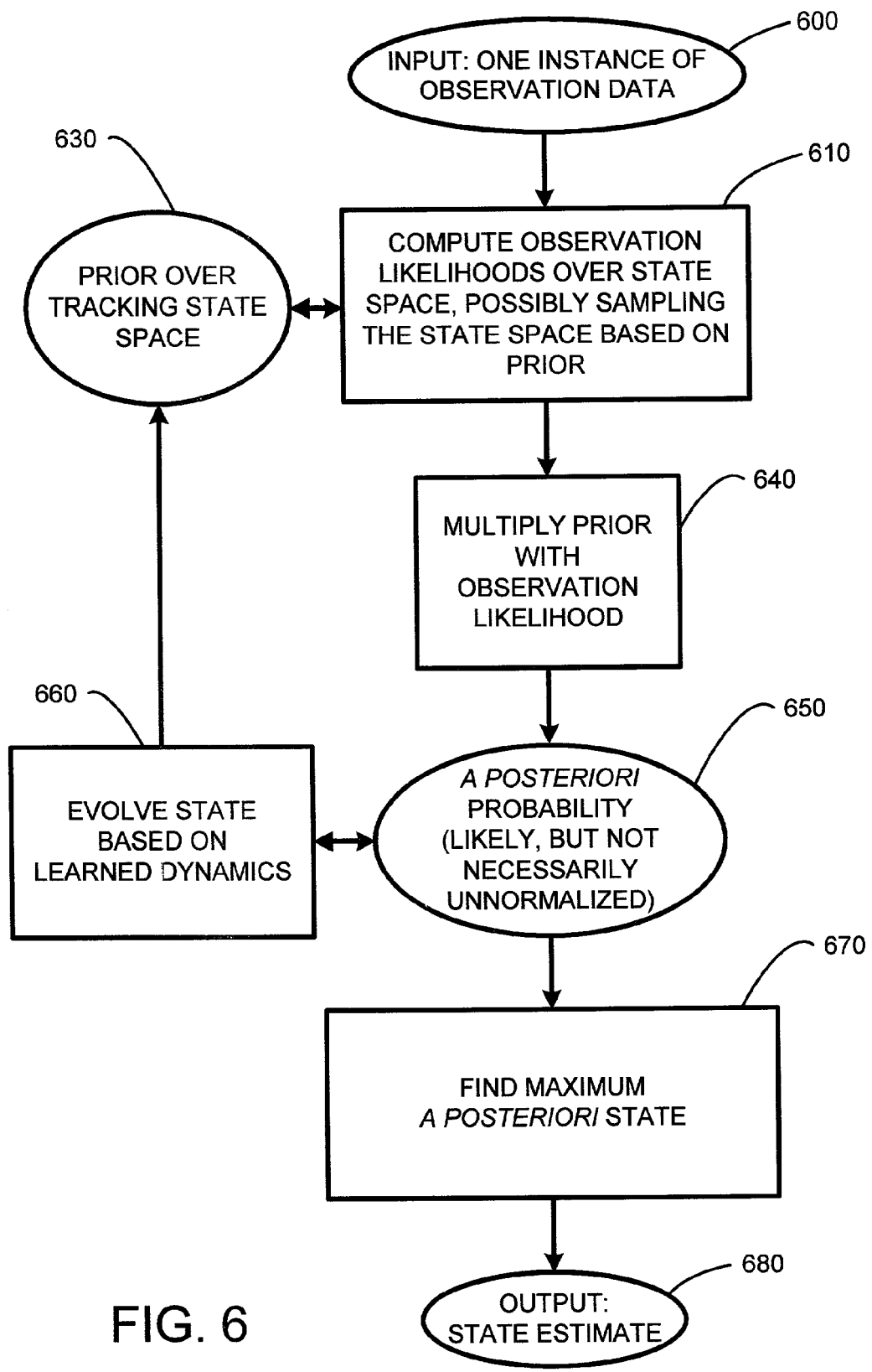
FIG. 6 illustrates an exemplary tracking algorithm for implementing probabilistic exemplar-based tracking in accordance with the present invention.

3.3.4 Probabilistic Tracking:

As noted above, once the observation likelihood functions have been computed for each exemplar cluster, they are used in a conventional tracking system for tracking continuous patterns in a sequence of images, and in space, or frequency. FIG. 6 illustrates a generic Bayesian tracking paradigm used in accordance with the present invention. Such probabilistic tracking systems are well known to those skilled in the art. Consequently, only a basic summary of such a system will be provide herein.

In general, probabilistic exemplar-based pattern tracking, as illustrated by FIG. 6, begins by inputting a single instance of observation data 600. For example, a single instance of such data might be a single image frame within which pattern tracking is desired. Next, the observation likelihood is computed over the state space of the observation data 610.

Once the observation likelihoods are computed over the state space 610, the observations are multiplied by a prior 640. Note that this prior is a prior over the tracking state space computation 630. This multiplication 640 provides an a posteriori probability of the target state 650. This state is evolved 660 based on learned dynamics, as discussed above. Evolution of the state produces a prior over the tracking state space 630 which is again used to compute the observation likelihoods 610. This iterative probabilistic process continues so as to find a maximum a posteriori state 670 which is then simply output as a state estimate 680 of the target pattern.

4.0 Working Example:

In a working example of the present invention, the program modules described in Section 2.6 with reference to FIG. 2 in view of the detailed description provided in Section 3 were employed to track patterns using a probabilistic exemplar-based tracking process. Details of a group of experiments illustrating the success of the probabilistic exemplar-based tracking system and method of the present invention are provided in the following section. Tracking using both contour-based exemplars and image patch exemplars was examined.

4.1 Results:

In order to demonstrate the necessity for, and applicability of, the $M^2$ model, tracking experiments were performed in two separate domains. In the first case, walking people were tracked using contour edges. In this case, background clutter and simulated occlusion threatened to distract tracking without a reasonable dynamic model and a good likelihood function. In the second case, a person's mouth position and orientation is tracked based on raw pixel values. Unlike the person-tracking domain, in the second case, images are cropped such that only the mouth, and no back-ground, is visible. While distraction is not a problem, the complex articulations of the mouth make tracking difficult.

Figure 8:
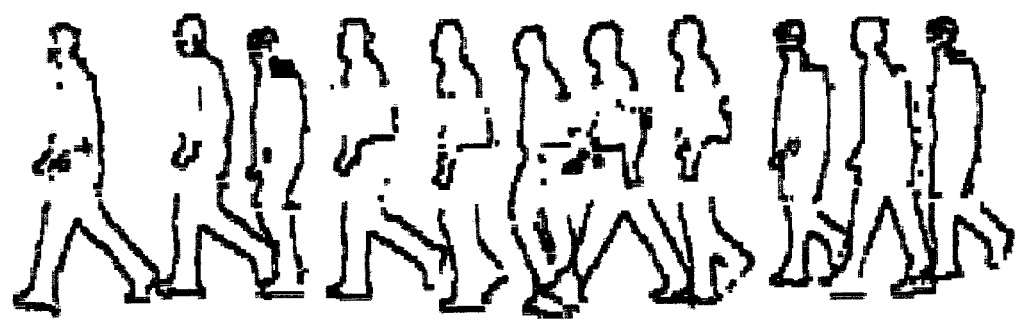
FIG. 8 illustrates a randomly generated sequence of exemplars using only learned dynamics in a working example of the present invention.

For the person tracking experiments, training and test sequences show various people walking from right to left in front of a stationary camera. The background in all of the training sequences is fixed, which allowed use of simple background subtraction and edge-detection routines to automatically generate the exemplars. Examples of a handful of exemplars are shown in FIG. 8 which shows a randomly generated sequence using only learned dynamics. Edges shown represent the contours of model exemplars. To the extent that topology fluctuates within a given mixture component, the linearity assumption of Section 3.2.1 is met only approximately.

Dynamics were learned as described in Section 3.3.3 on 5 sequences of the same walking person, each about 100 frames long. Note that FIG. 8 overlays several frames from a sequence generated solely on the basis of learned dynamics as described in Section 3.3.3.

In validating the $M^2$ model, the assumption was first made regarding the $M^2$ approach that the d values computed from Equation 9 give rise to reasonable partition functions. The suitability of this assumption was tested for the chamfer distance by conducting experiments on synthetically generated ellipses with up to 4 degrees of freedom. Note that the results provided in the table of FIG. 10 support the argument that d can be computed from training data alone, given a reasonable distance function, and that d does in fact correlate with the degrees of freedom of curve variation.

Figures 9, 10:
FIG. 9 illustrates tracking of multiple target objects in a single frame of cropped images from a tracked sequence of images processed in a working example of the present invention.
FIG. 10 illustrates an exemplary Table which provides metric mixture parameters of an observation likelihood function estimated for exemplar clusters when using a chamfer distance with contours for tracking people in a sequence of images in a working example of the present invention.

The table of FIG. 10 also shows values of d for the pedestrian exemplars. Note that dimensionality increases with cluster size up to a point, but it eventually converges to d≈5. This convergence is interpreted as assurance that d is a function of the local dimensionality rather than of cluster size.

Figure 7:
FIG. 7 illustrates exemplary cropped images from a tracked sequence of images processed in a working example of the present invention.

Given this dimensionality estimate, the observation likelihoods can be computed as illustrated by Equation 5. The desired pattern, in this case a person walking, is then tracked using the following Bayesian framework:

A classical forward algorithm would give $p_t(X_t) \equiv p(X_t|Z_1, \ldots, Z_t)$ as:

$$p_t(X_t) = \sum_{k_t-1 \alpha_t-1} \int p(z|X_t) p(X_t|X_{t-1}) p_{t-1}(X_{t-1}),$$

where $p(z|X)$ is computed in accordance with Equation 5. Exact inference is infeasible given that $\alpha$ is real-valued, so the integral is performed using a conventional form of particle filter. To display results, $\hat{X} = \text{argmax } p_t(X_t)$ is calculated. Note that FIG. 7 shows cropped, sample images of tracking on a sequence that was not in the training sequence. Tracking in this case is straightforward and accurate. FIG. 9 shows the same exemplar set (trained on one person) used to track a different person entirely. Although the swing of this subject's arms is not captured by the existing exemplars, the gait is nevertheless accurately tracked. In addition, FIG. 9 also demonstrates the capability of probabilistic exemplar-based tracking to discriminate two targets simultaneously. Further, experiments were run to verify tracking robustness against occlusion and other visual disturbances. For example, in one test run, occlusions were simulated by rendering black two adjacent frames out of every ten frames in the test sequence. Consequently, tracking was forced to rely on the prior in these frames. The sequence was accurately tracked in the non-occluded frames, bridged by reasonable state estimates in the black frames—something that would be impossible without incorporation of the aforementioned learned dynamics.

For the mouth tracking experiments, the mouth tracking sequences consisted of closely cropped images of a single subject's mouth while the person was speaking and making faces. The training sequence consisted of 210 frames captured at 30 Hz. A longer test sequence of 570 frames was used for the actual tracking experiments. Dynamics were learned as in Section 3.3.3, with K=30 exemplar clusters. Tracking was performed as described above for the person racking case, but with no transformations, since the images were largely registered. On this training set, the shuffle distance d values exhibited greater variance, with the extremes running from 1.2 to 13.8. However, the majority of clusters showed a dimensionality of d=4±1, indicating again that the dimension constant d in the $M^2$ model is learned consistently.

The results of the mouth tracking experiment shows that the success of the tracking is dependent on the type and accuracy of the distance metric chosen for estimating the distance between exemplars in clusters. In particular, the result of tracking based on the $L_2$ distance (Euclidean distance between vectors formed by concatenating the raw pixel values of an image), and tracking using the shuffle distance was determined through this experimentation. In the experiment, both functions performed well with the initial two-thirds of the test sequence, during which the subject was speaking normally. However, as soon as the subject began to make faces and stick out his tongue, the $L_2$-based likelihood crumbled, whereas tracking based on the shuffle distance remained largely successful.

In particular, FIG. 11A through FIG. 11H provides a comparison of maximum-likelihood matches, on one of the difficult test images—a tongue sticking out to the left—for a variety of distance functions. Most of the functions prefer an exemplar without the tongue. This may be because of the high contrast between pixels projected dimly by the inside of the mouth and those projected brightly by lip and tongue; even a small difference in tongue configuration can result in a large difference in $L_2$ and other distances. On the other hand, the flow-based distance and the shuffle distance (really an inexpensive version of the flow-based distance) return exemplars that are perceptually similar. These functions come closer to approximating perceptual distances by their relative invariance to local warping of images.

Specifically, FIG. 11A illustrates the test image to be tracked. FIG. 11B illustrates the patch exemplar returned using an $L_2$ distance. FIG. 11C illustrates the patch exemplar returned using an $L_2$ distance after blurring. FIG. 11D illustrates the patch exemplar returned using histogram matching for distance determination. FIG. 11E illustrates the patch exemplar returned using an $L_2$ distance after projecting to PCA subspace with 20 bases. FIG. 11E illustrates the patch exemplar returned using an $L_2$ distance after projecting to PCA subspace with 80 bases. FIG. 11F illustrates the patch exemplar returned using an $L_2$ distance after image warp based on optic flow. Finally, FIG. 11E illustrates the patch exemplar returned using an the shuffle distance described above. As can be clearly seen from the images, only the image patch exemplars of FIG. 11G and FIG. 11H match the test image patch of FIG. 11A. Thus, from this simple experiment, it is clear that a careful selection of distance metrics used in clustering the exemplars and determining the metric exponential serves to improve tracking performance.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for automatic probabilistic pattern tracking comprising:
   automatically learning a set of exemplars from at least one set of training data; clustering the exemplars into more than one cluster of exemplars, with each cluster having a representative exemplar at a cluster center;
   generating an observation likelihood function for each exemplar cluster based on a computed distance between the exemplars in each cluster;
   providing the exemplar clusters, observation likelihood functions, and target data to a probabilistic tracking function; and
   probabilistically tracking at least one pattern in the target data by using the exemplar clusters, observation likelihood functions, and target data to predict at least one target state.

2. The system of claim 1 wherein clustering of exemplars is achieved using an iterative k-medoids clustering process based on a computed distance between the representative exemplar at the center of each cluster and each of the exemplars clustered with that exemplar.

3. The system of claim 1 wherein generating the observation likelihood functions comprises using a multidimensional scaling process to estimate a dimensionality of each exemplar cluster.

4. The system of claim 1 wherein the training data is image data, and wherein contour-based exemplars are extracted from the training data using conventional edge detection techniques to process the training data.

5. The system of claim 4 wherein the contour-based exemplars are used for probabilistically tracking at least one object in a sequence of images.

6. The system of claim 1 wherein the training data is image data, and wherein image patches representing target objects of interest are extracted as exemplars from the training data.

7. The system of claim 6 wherein the image patch-based exemplars are used for probabilistically tracking at least one object in a sequence of images.

8. The system of claim 1 wherein the observation likelihood functions are iteratively updated while tracking patterns in the target data.

9. The system of claim 2 wherein the exemplars are contour-based exemplars, and wherein the computed distance between exemplars is a chamfer distance.

10. The system of claim 2 wherein the exemplars are image patch-based exemplars, and wherein the computed distance between exemplars is a shuffle distance.

11. The system of claim 1 wherein the target data is space-based data, and wherein probabilistically tracking at least one pattern in the target data comprises tracking at least one pattern in a space-domain.

12. The system of claim 1 wherein the target data is a sequence of images, and wherein probabilistically tracking at least one pattern in the target data comprises tracking at least one pattern in the sequence of images.

13. The system of claim 1 wherein the target data is frequency-based data, and wherein probabilistically tracking at least one pattern in the target data comprises tracking at least one pattern in a frequency-domain.

14. A method for generating a set of observation likelihood functions from a set of exemplars comprising using a computer to:
   derive more than one exemplars from at least one set of training data to create a set of exemplars;
   randomly select more than one exemplar from the set of exemplars; iteratively cluster similar exemplars from the set of exemplars around the randomly selected exemplars to form an exemplar cluster for each of the randomly selected exemplars;
   estimate a dimensionality for each of the exemplar clusters based on the computed minimum distances between exemplars in each exemplar cluster; and
   compute an observation likelihood function for each exemplar cluster based on the dimensionality of each exemplar cluster.

15. The method of claim 14 wherein a similarity between exemplars is determined by computing a minimum distance between exemplars in the set of exemplars and each of the randomly selected exemplars.

16. The method of claim 14 wherein the training data is image data.

17. The method of claim 16 wherein the exemplars are contour-based exemplars.

18. The method of claim 17 wherein the computed minimum distances are computed by a chamfer distance function.

19. The method of claim 16 wherein the exemplars are image-patch exemplars.

20. The method of claim 19 wherein the computed minimum distances are computed by a shuffle distance function.

21. The method of claim 14 further comprising aligning exemplars prior to iteratively clustering the exemplars.

22. The method of claim 14 further comprising probabilistically tracking at least one pattern in target data by using the exemplar clusters, observation likelihood functions, and target data to predict at least one target state.

23. A computer-implemented process for tracking patterns, comprising using a computer to:
   extract a set of exemplars from training data;
   cluster the exemplars based on a minimization of a maximum distance between exemplars, and wherein each cluster includes a representative exemplar at the center of each cluster;
   estimate a dimensionality for each exemplar cluster;
   generate a likelihood function for each exemplar cluster using the estimated dimensionality;
   provide the likelihood function, exemplar clusters, and target data to a tracking function; and
   track at least one pattern in the target data using the tracking function in combination with the likelihood function and exemplar clusters.

24. The computer-implemented process of claim 23 wherein extracting exemplars from training data comprises extracting parameters from the training data that are statistically representative of at least one target pattern.

25. The computer-implemented process of claim 23 wherein clustering the exemplars comprises using a k-medoid clustering process to cluster similar exemplars.

26. The computer-implemented process of claim 23 wherein estimating a dimensionality for each cluster of exemplars comprises fitting a chi-squared distribution to a distribution of distances from the representative exemplar at the center of each cluster to each of the other exemplars in that cluster.

27. The computer-implemented process of claim 23 wherein estimating a dimensionality for each cluster of exemplars comprises fitting a gamma distribution to a distribution of distances from the representative exemplar at the center of each cluster to each of the other exemplars in that cluster.

28. The computer-implemented process of claim 23 wherein estimating a dimensionality for each cluster of exemplars comprises using multidimensional scaling of distances from the representative exemplar at the center of each cluster to each of the other exemplars in that cluster to estimate the dimensionality for each cluster.

29. The computer-implemented process of claim 23 wherein each exemplar is represented by an unparameterized curve, and wherein the distance between exemplars is a chamfer distance.

30. The computer-implemented process of claim 23 wherein each exemplar is represented by an image patch, and wherein the distance between exemplars is a shuffle distance.

31. The computer-implemented process of claim 23 wherein exemplars are geometrically transformed in Euclidian space in order to align the exemplars prior to clustering the exemplars.

32. A computer-readable medium having computer executable instructions for automatically tracking patterns in a set of tracking data, said computer executable instructions comprising:
   generating at least one set of clustered exemplars from a set of training data;
   for each exemplar cluster, computing a distance between a representative exemplar at a center of each cluster and each of the other exemplars in that cluster;
   using the computed distance to estimate an observation likelihood function for each cluster of exemplars; and
   using the observation likelihood function for each cluster of exemplars to probabilistically track at least one pattern in at least one set of tracking data.

33. The computer-readable medium of claim 32 wherein generating at least one set of clustered exemplars comprises extracting exemplars statistically representative a target pattern from the training data, and then using a k-medoids process to cluster the exemplars into a predefined number of clusters.

34. The computer-readable medium of claim 32 wherein computing a distance between the representative exemplar at the center of each cluster and each of the other exemplars in that cluster comprises using a distance function to compute the distance.

35. The computer-readable medium of claim 32 wherein estimating an observation likelihood function for each cluster of exemplars comprises fitting either of a chi-squared distribution and a gamma distribution to a distribution of distances from the representative exemplar at the center of each cluster to each of the other exemplars in that cluster to estimate a dimensionality and an exponential constant for the observation likelihood function.

36. The computer-readable medium of claim 32 wherein probabilistically tracking at least one pattern in at least one set of tracking data comprising tracking at least one pattern in a space-domain.

37. The computer-readable medium of claim 32 wherein probabilistically tracking at least one pattern in at least one set of tracking data comprising tracking at least one pattern in a sequence of images.

38. The computer-readable medium of claim 32 wherein probabilistically tracking at least one pattern in at least one set of tracking data comprising tracking at least one pattern in a frequency-domain.

* * * * *